(No Model.)  2 Sheets—Sheet 1.

C. E. ECKLUND.
CORN HEADER.

No. 605,635. Patented June 14, 1898.

Witnesses  
Jas. K. McCathran  
V. B. Hillyard

Inventor  
Charles E. Ecklund  
By his Attorneys,  
C. A. Snow & Co.

(No Model.) 2 Sheets—Sheet 2.
C. E. ECKLUND.
CORN HEADER.
No. 605,635. Patented June 14, 1898.
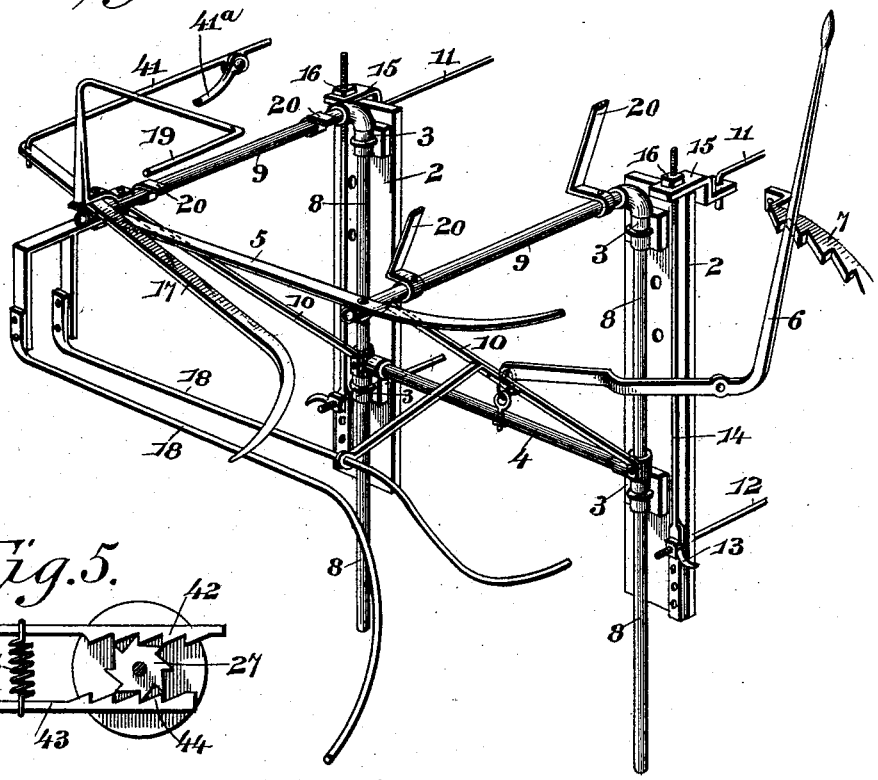
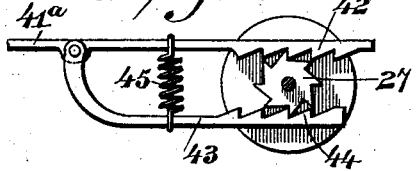
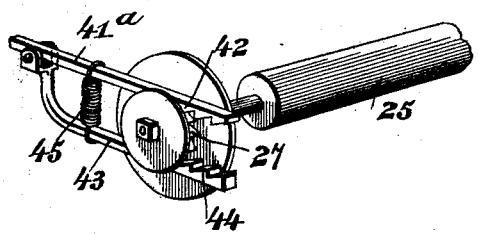
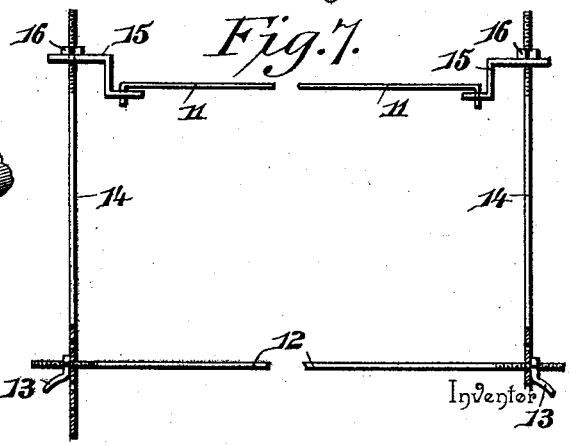
Witnesses
Jas. H. McCathran
V. B. Hillyard
Inventor
Charles E. Ecklund
By his Attorneys,
C. A. Snow & Co.

UNITED STATES PATENT OFFICE.

CHARLES E. ECKLUND, OF VILAS, KANSAS.

CORN-HEADER.

SPECIFICATION forming part of Letters Patent No. 605,635, dated June 14, 1898.

Application filed January 20, 1897. Serial No. 619,943. (No model.)

*To all whom it may concern:*

Be it known that I, CHARLES E. ECKLUND, a citizen of the United States, residing at Vilas, in the county of Wilson and State of Kansas, have invented a new and useful Corn-Header, of which the following is a specification.

This invention relates to machines for harvesting Kafir corn or like grain borne at the upper ends of the stalks, said machine operating by cutting off the heads and collecting the same in the wagon to which the harvesting mechanism is attached, leaving the stalks or straw standing in the field. The harvesting mechanism is provided in the form of an attachment, so as to be applied to any ordinary farm-wagon, and is adjustable to suit the height of the grain to be harvested, the several parts being at all times under control, whereby the mechanism may be thrown into or out of gear or raised and lowered.

For a full understanding of the merits and advantages of the invention, reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
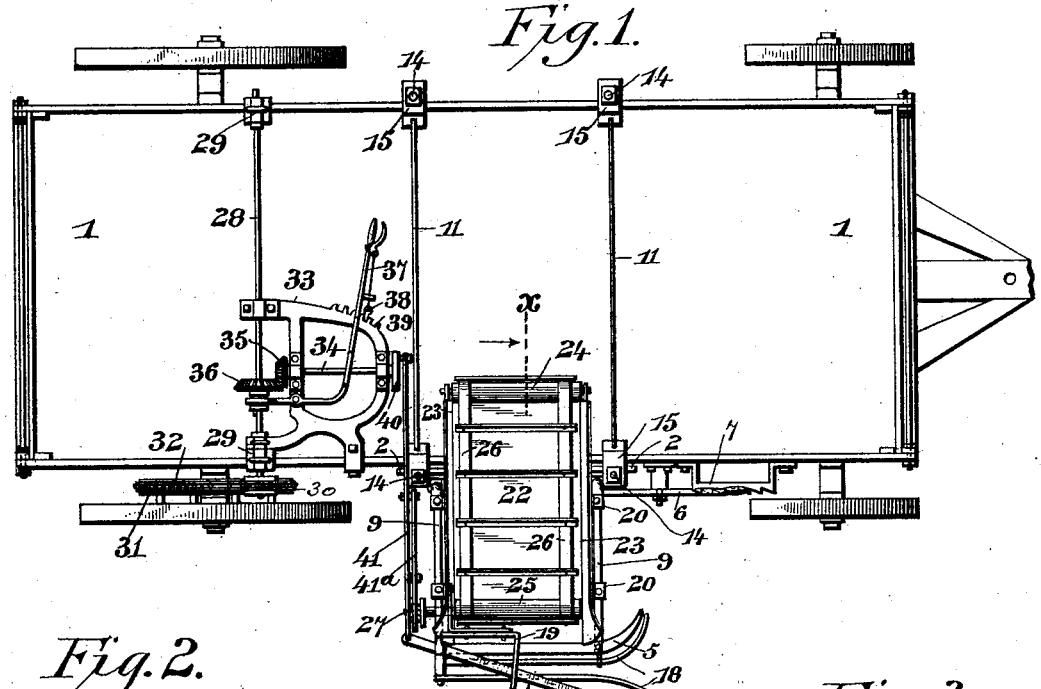
Figures 2, 3:
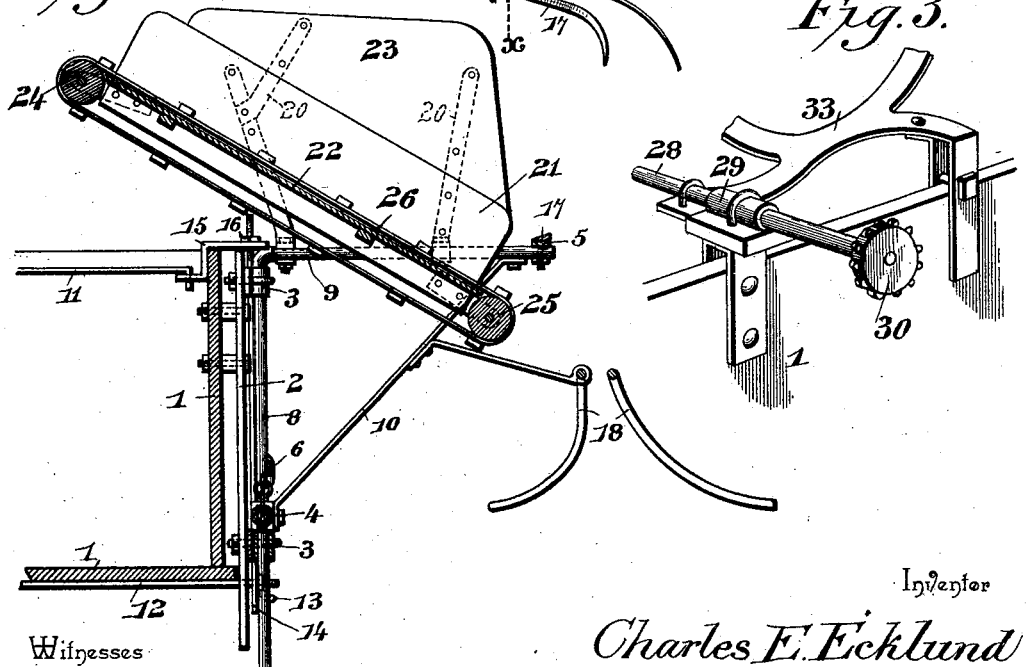

Figure 1 is a top plan view of a farm-wagon having the improved harvesting mechanism applied thereto. Fig. 2 is a detail section on the line X X of Fig. 1, looking in the direction of the arrow. Fig. 3 is a fragmentary view showing the means for connecting the frame of the actuating mechanism to a side of the wagon-body. Fig. 4 is a detail perspective view of the frame of the harvesting attachment, showing the cutting mechanism, the elevating devices, and some of the parts associated therewith. Figs. 5 and 6 are detail views of the means for transmitting motion to the elevator. Fig. 7 is a detail view of the means for securing the frame of the harvesting attachment to the wagon-body.

Corresponding and like parts are referred to in the following description and indicated in the several views of the accompanying drawings by the same reference characters.

The wagon 1, to which the harvesting attachment is applied, may be of any style or make, such as usually found on a farm, and the harvesting mechanism is applied thereto only at times when it is required to reap the harvest. Plates or boards 2 are secured to a side of the wagon-body to stiffen and strengthen it, and clips or fastenings 3 are applied thereto for holding the frame of the harvesting mechanism in an adjusted position. This frame is constructed, preferably, of tubular bars and comprises similar side pieces connected by a cross-bar 4 and a blade or stationary knife 5 and is adjusted vertically by means of a lever 6, operating in conjunction with a notched segment 7, the latter serving to hold the lever in an adjusted position until the clips or fastenings 3 are tightened, so as to clamp the frame in any required position. Of course if it be desired to have the frame loosely mounted in the fastenings 3 the latter will be loosened sufficiently to prevent binding and interference when adjusting the frame in the field without necessitating the stopping of the team. The side pieces of the frame comprise uprights 8 and horizontal members 9, the latter being strengthened by braces 10.

The plates or boards 2, as well as the sides of the wagon-body, are prevented from relative outward movement by means of transverse rods 11 and 12, the latter having their end portions threaded to receive hand-nuts 13 and passing through corresponding openings in the lower ends of vertical rods 14. Angle-plates 15 are mounted upon the upper threaded ends of the rods 14 and are held in place by nuts 16, and their inner horizontal portions are apertured to receive the bent ends of the rods 11. The tie-rods 12 pass beneath the wagon-body, as indicated most clearly in Fig. 2, and the connecting-rods 11 extend across the upper end thereof and serve to hold the vertical portion of the angle-plates 15 against the inner faces of the sides of the wagon-body.

A blade 17 is pivoted near its rear end to the rear portion of the frame and coöperates with the blade 5 to sever the heads of the grain as the wagon is drawn over the field, said blade being operated by mechanism presently to be described. Guide-rods 18 extend in parallel relation for the greater part of their length, and their front ends curve downwardly and outwardly, forming the flaring mouth to direct the heads of the grain into the throat or passage formed between the guide-rods 18, the downward curvature of the front ends of the rods 18 serving to elevate the bent ends of drooping grain. The blades 5 and 17 are located directly above the guide-rods 18, and the space formed between them when open corresponds to the throat or passage between the guide-rods 18, and the front ends of these blades curve in opposite directions, so as to properly direct the heads between the blades. A stop 19 overhangs the blades 5 and 17 and limits the rearward movement of the grain between the blades, so as to prevent the heads thereof when cut falling in the rear of the elevator, and this stop 19 is the bent end portion of a bracket or rod secured to the frame, as most clearly indicated in Fig. 4.

The elevator is of ordinary construction and is secured to the horizontal portions 9 of the frame by means of strap-irons 20, which are attached to the parts 9 in any convenient way. The elevator inclines upwardly and inwardly and is so disposed as to receive the heads of the grain as the latter are severed from the stalks by the cutting mechanism and deliver the said heads into the wagon. The elevator-frame comprises side pieces 21, a table 22, connecting the side pieces, and guards 23, the latter serving to increase the height of the side pieces 21, so as to prevent any wind from blowing the heads of grain from off the elevator during their passage from the cutting mechanism to the point where they drop into the wagon. A roller 24 is located at the upper end of the elevator-frame, and a similar roller 25 is located at the lower end of the elevator-frame, and an endless carrier 26 is supported by the rollers 24 and 25, and its upper portion travels over and is sustained by the table 22. This endless carrier is of ordinary construction and comprises a belt or tapes and cross-slats, the latter serving as means to engage with the heads of grain and move them positively from the cutting mechanism to the upper end of the elevator, from whence they drop into the wagon. A journal of the roller 25 is extended and is provided with a ratchet-wheel 27, to which the power is applied for operating the elevator.

A shaft 28 extends transversely of the wagon-body and is journaled in bearings 29, secured to the upper edges of the side pieces, and a sprocket-pinion 30 is secured to one end of the shaft 28 and is driven from a sprocket-wheel 31, secured to a wheel of the wagon by means of a sprocket-chain 32, the latter passing around the sprocket-wheel 31 and the sprocket-pinion 30. A frame 33 is supported by means of the shaft 28 on a side of the wagon-body and has a shaft 34 journaled thereto, said shaft having a bevel-gear 35, adapted to intermesh with a corresponding bevel-gear 36, loosely mounted upon the shaft 28, so as to move thereon but rotate therewith, said bevel-gear 36 being moved by a shipper-lever 37, fulcrumed to the frame 33 and held in an adjusted position by a hand-operated latch 38, adapted to engage with a series of teeth 39, provided on the frame 33. By a proper manipulation of the shipper-lever 37 the gear-wheels 35 and 36 may be thrown into or out of mesh, thereby throwing the harvesting mechanism into or out of gear, as desired. A crank 40 is secured to one end of the shaft 34, and a pitman 41 connects it with the pivoted blade 17, thereby vibrating the said pivoted blade for cutting the heads of grain when the machine is in operation. The outer end of the pitman 41 has a pivoted portion 41ª, provided with teeth 42, to engage with the teeth of the ratchet-wheel 27, so as to move the latter in one direction to operate the elevator. An arm 43 has pivotal connection with the part 41ª and has teeth 44, corresponding with the teeth of the ratchet-wheel 27 to engage therewith, and is held in place by a spring 45, the latter connecting the arm 43 with the part 41ª a short distance from the pivotal connection between the two. The teeth 42 and 44 are inversely disposed, so that when one set of teeth are in positive engagement with the teeth of the ratchet-wheel 27 the other set of teeth ride upon the teeth of the ratchet-wheel and the two sets of teeth are disposed to operate alternately, whereby a continuous rotary movement is imparted to the ratchet-wheel 27 and the elevator during the reciprocating movements of the pitman 41.

When the harvesting attachment is not required for use, it can be readily disconnected from the wagon and laid aside until harvest time or until required for service, when it may be easily applied to the farm-wagon and will operate as effectually as a machine especially designed for harvesting grain in the manner specified.

Having thus described the invention, what is claimed as new is—

1. The combination with a wagon-body, and a harvesting attachment, of the following means for detachably connecting the harvesting attachment with the wagon-body, consisting of plates, fastenings for securing the harvesting attachment to the plates, vertical rods threaded at their upper ends and having a series of openings at their lower ends, tie-rods connecting the lower ends of the vertical rods and passing through corresponding openings therein, angle-plates placed upon the upper ends of the vertical rods and having their vertical portions engaging with the inner faces of the side pieces of the wagon-body, and rods connecting oppositely-disposed angle-plates, substantially as set forth.

2. In a corn-harvester, the combination of longitudinal cutters having their front ends curving outwardly, and longitudinal guide-bars placed below the cutters and spaced apart, forming a passage for the stalks, and having their front ends curving forwardly, outwardly and downwardly to gather in leaning stalks, and having a space between their rear ends, substantially as set forth.

3. In a harvesting mechanism, the combination of a cutting apparatus comprising an oscillating part, an elevator for receiving the grain as cut and directing it into a receptacle, actuating mechanism, and a single pitman for transmitting motion from the actuating mechanism to the elevator and cutting apparatus for simultaneously operating each, substantially in the manner specified.

4. In a harvesting mechanism, the combination of a cutting apparatus comprising an oscillating part, an elevator for conveying the grain to a receptacle, actuating mechanism, a pitman for transmitting motion from the actuating mechanism to the cutting apparatus, an extension having pivotal connection with the pitman, and a ratchet mechanism between the pivoted extension and elevator, whereby the latter is operated simultaneously with the cutting apparatus by means of the same pitman, substantially as set forth.

5. In a harvesting mechanism, the combination of the cutting apparatus, an elevator for conveying the grain to a receptacle, a ratchet-wheel applied to a journal of the elevator, actuating mechanism, a pitman for transmitting motion from the actuating mechanism to the cutting apparatus, an extension having pivotal connection with the pitman and provided with a toothed portion for direct engagement with the said ratchet-wheel, a pivoted arm applied to the pivoted extension and having a toothed portion to engage with the said ratchet-wheel and move it when the pivoted extension is returning to a normal position, and a spring interposed between the pivoted arm and extension, substantially as set forth.

In testimony that I claim the foregoing as my own I have hereto affixed my signature in the presence of two witnesses.

CHARLES E. ECKLUND.

Witnesses:
 C. LANDER,
 JOHN ECKLUND.